July 14, 1964  H. BALMER ETAL  3,140,835
BOWL CLAMPING MECHANISM FOR CONE CRUSHERS
Filed Nov. 14, 1961  5 Sheets-Sheet 1

INVENTORS.
HANSJÖRG BALMER
RUDOLPH J. GASPARAC
BY Parker & Carter
Attorneys.

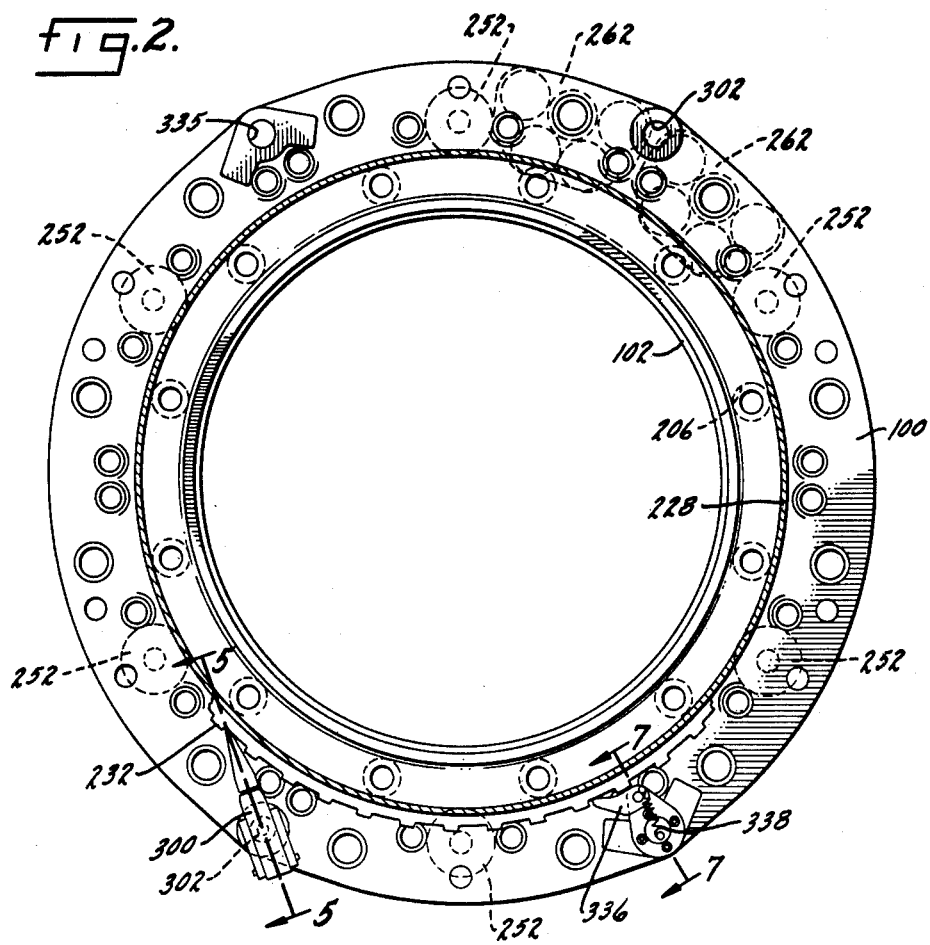
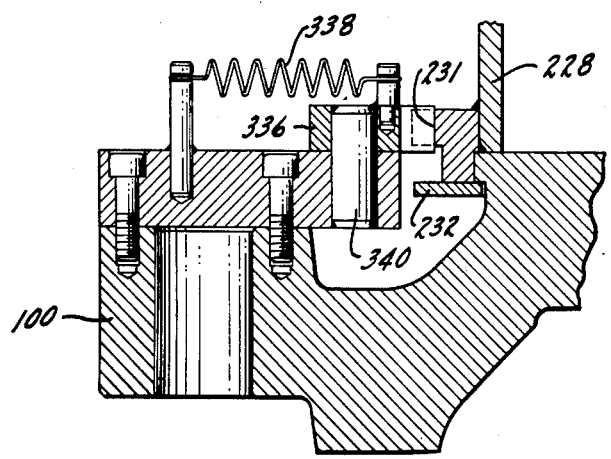

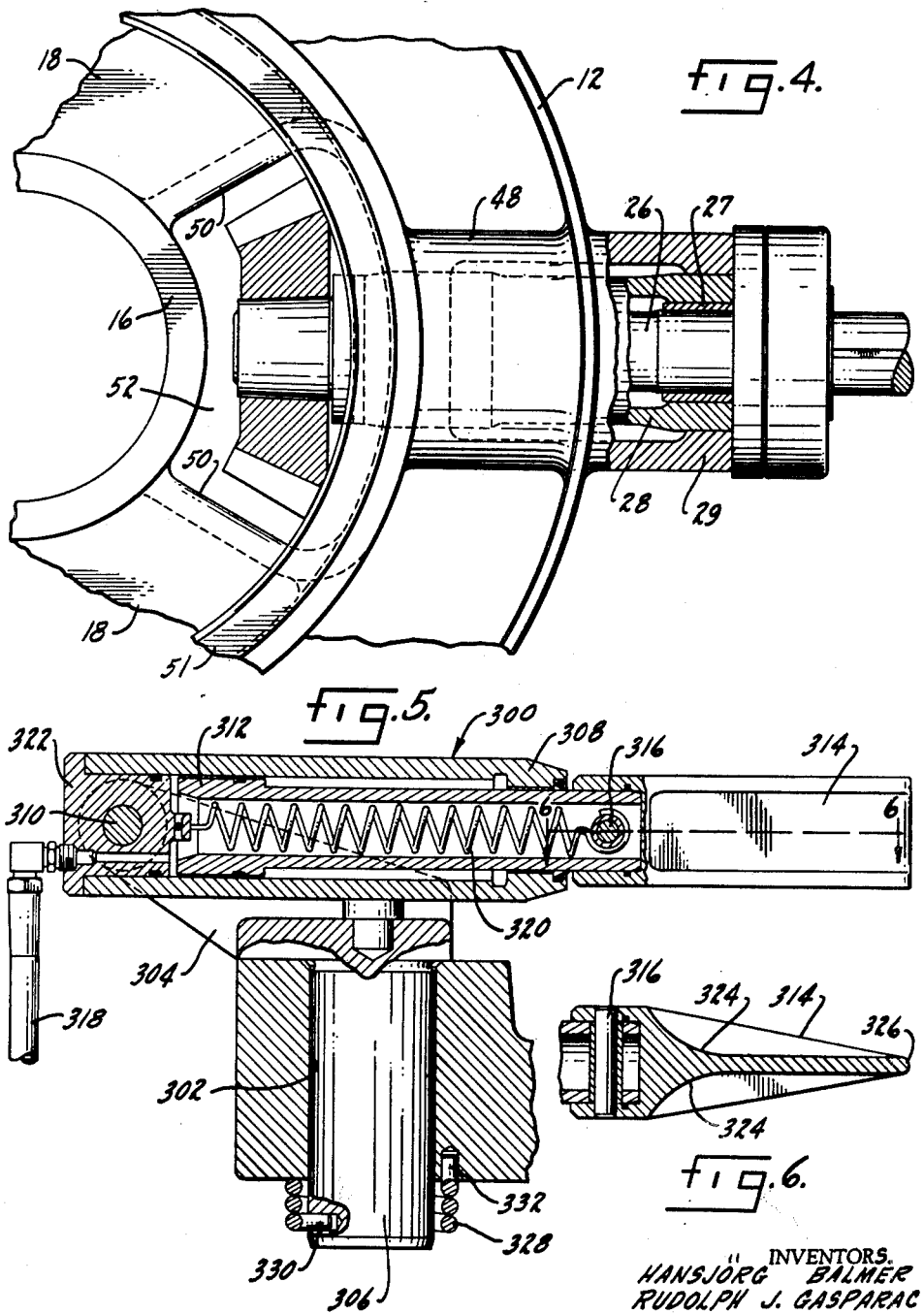

United States Patent Office 3,140,835
Patented July 14, 1964

3,140,835
BOWL CLAMPING MECHANISM FOR
CONE CRUSHERS
Hansjörg Balmer and Rudolph J. Gasparac, both of Milwaukee, Wis., assignors to Nordberg Manufacturing Company, Milwaukee, Wis., a corporation of Wisconsin
Filed Nov. 14, 1961, Ser. No. 152,222
9 Claims. (Cl. 241—286)

This invention is in the field of material reduction machines and is concerned, among other things, with an improved gyratory crusher.

A primary object of the invention is an improved gyratory crusher which is efficient in use.

Another object is a power adjustment for the bowl of a gyratory crusher.

Another object is a gyratory crusher with an improved sealing arrangement to keep dust and dirt out of the bowl threads which reduces the height of the crusher significantly.

Another object is an improved ram structure for adjusting the bowl of a gyratory crusher.

Another object is a mechanism for removing thread clearance between the bowl and adjustment ring.

Other objects will appear from time to time in the ensuing specification and drawings in which:

FIGURE 2 is a section along line 2—2 of FIGURE 1, with parts removed for clarity;

FIGURE 4 is a top plan view, partly in section, of the frame and drive;

FIGURE 5 is a section along line 5—5 of FIGURE 2, on an enlarged scale;

FIGURE 6 is a section along line 6—6 of FIGURE 5;

FIGURE 7 is a section along line 7—7 of FIGURE 2 on an enlarged scale; and

Figure 1:
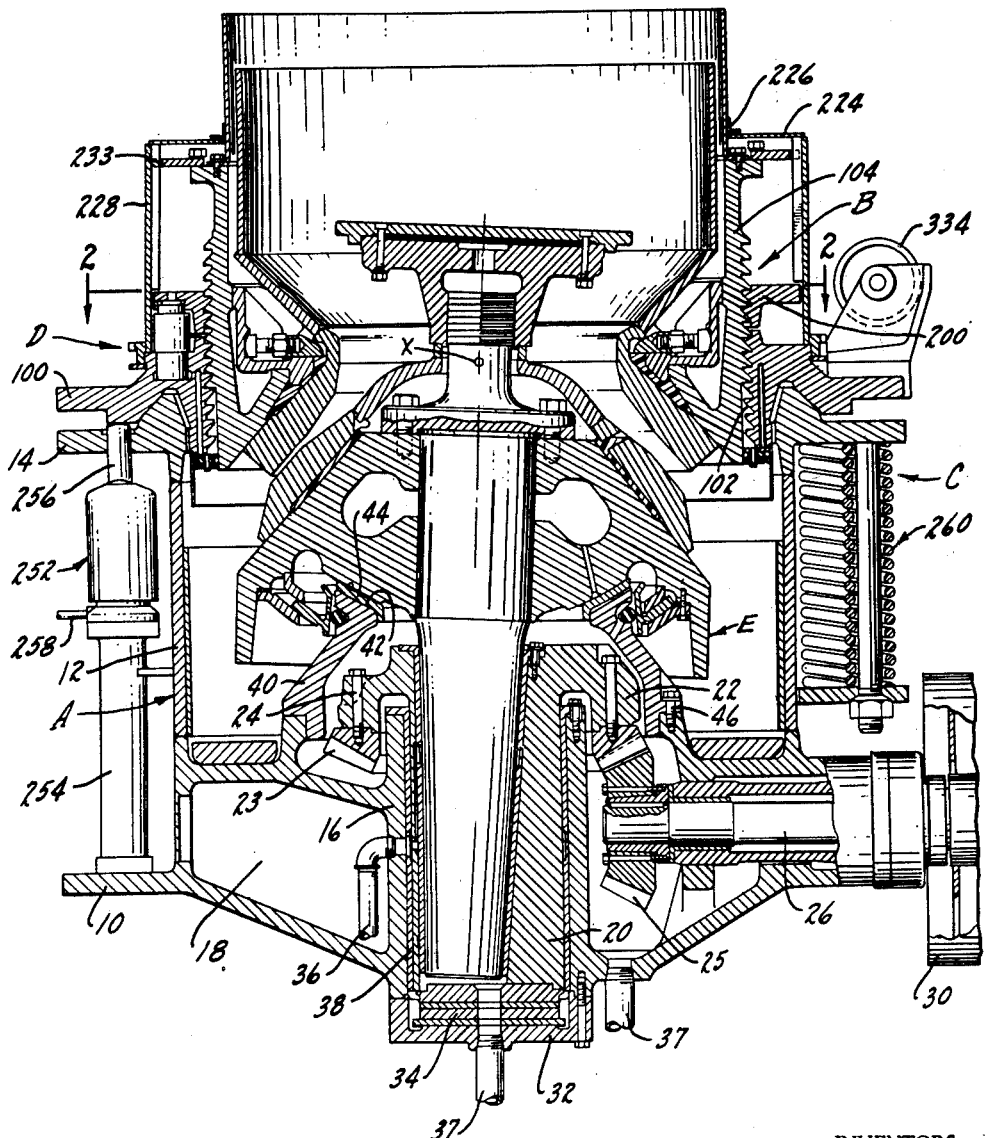
FIGURE 1 is a vertical section of a gyratory crusher.

In FIGURE 1, a crusher has been shown generally including the following main parts, a main frame A which supports a bowl structure B releasably held on the main frame by a release mechanism C and arranged to be adjusted by an adjustment mechanism D. The main frame also supports a crushing head E defining a crushing cavity with the bowl.

The main frame A includes a base flange 10 with an upstanding housing 12 and a supporting flange 14 for the bowl structure at the upper end. The base flange is connected to a center hub 16 by a web structure 18. The center hub supports an eccentric 20 which has a suitable counterweight 22 at its upper end overhanging the upper end of the center hub and connected to a ring gear 23 by bolts 24 or the like, which in turn is driven by a pinion 25 on a drive shaft 26 which in turn may be driven by a belt and pulley arrangement or any suitable means, not shown.

The drive shaft may be supported by bearings 27 in a sleeve 28 suitably held in a boss or journal 29 which is a part of the frame with a pulley 30 or the like at the outer end of the shaft.

Figure 3:
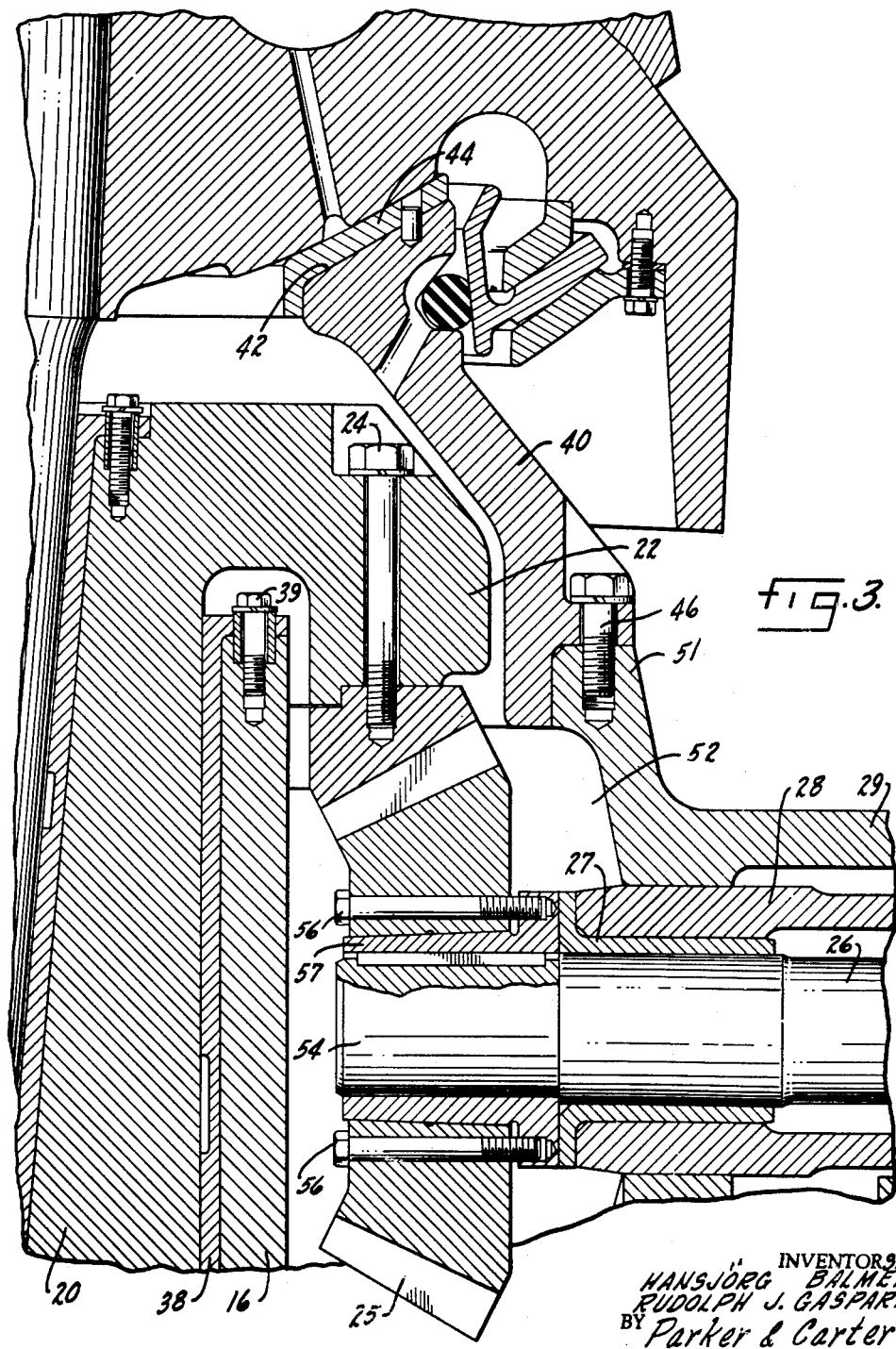
FIGURE 3 is an enlarged view of a portion of FIGURE 1.

The lower end of the center hub is closed by a bottom cap 32 which houses a thrust bearing arrangement 34 of any suitable type supporting the eccentric. The hub may have a suitable lubricant inlet connection, as at 36, with outlets at 37, and a suitable bearing sleeve 38 may line the center hub around the eccentric removably held in by bolts 39 or the like, in FIGURE 3. The webs around the center hub may be closed on top by a detachable annular support 40 which defines a socket 42 lined with a brass or bronze seat or liner 44 on its upper surface and described about a center of gyration X, for supporting the head. The support itself may be removably held on the main frame by bolts 46 or the like.

The main frame 12 may have the web structure 18 to the center hub 16 formed in cross section in a U, an H shape, or in a box or rod shape, as at 48 in FIGURE 4. It is preferred to use three such webs or arms. One of the arms 48 supports the drive shaft and sleeve, as shown in FIGURE 4, and the webs flare at 50 inside of the supporting ledge 51. The webs, center hub and supporting ledge thus form an upwardly opening pocket 52 so that when the head support 40 is removed, the drive pinion 25 may be inserted from above. To assemble the drive, the sleeve 28 with bearings and drive shaft are inserted through the arm 48. The drive pinion 25 is lowered into the pocket and the end 54 of the drive shaft is inserted into the pinion while the pinion is suspended in the pocket. Then the pinion may be connected to the end of the drive shaft by suitable bolts 56 or the like which pull the pinion up on a tapered bushing or sleeve 57. Thus the inside of the arm 48 may have a much smaller dimension than the pinion. Further the forces applied to the drive shaft are absorbed in the arm of the frame. The drive pinion may be readily removable, if removal is desired.

The bowl structure B may include an adjustment or tilting ring 100 screwthreaded as at 102 to a bowl 104.

The release mechanism C may include a locking ring 200 screwthreaded to the bowl and disposed above the adjustment ring. The locking ring may have a plurality of downwardly opening individual sockets 202 on its lower surface for clamping units 204. Each clamping unit may be positioned in a corresponding upwardly opening socket 206 in the adjustment ring.

Figure 8:
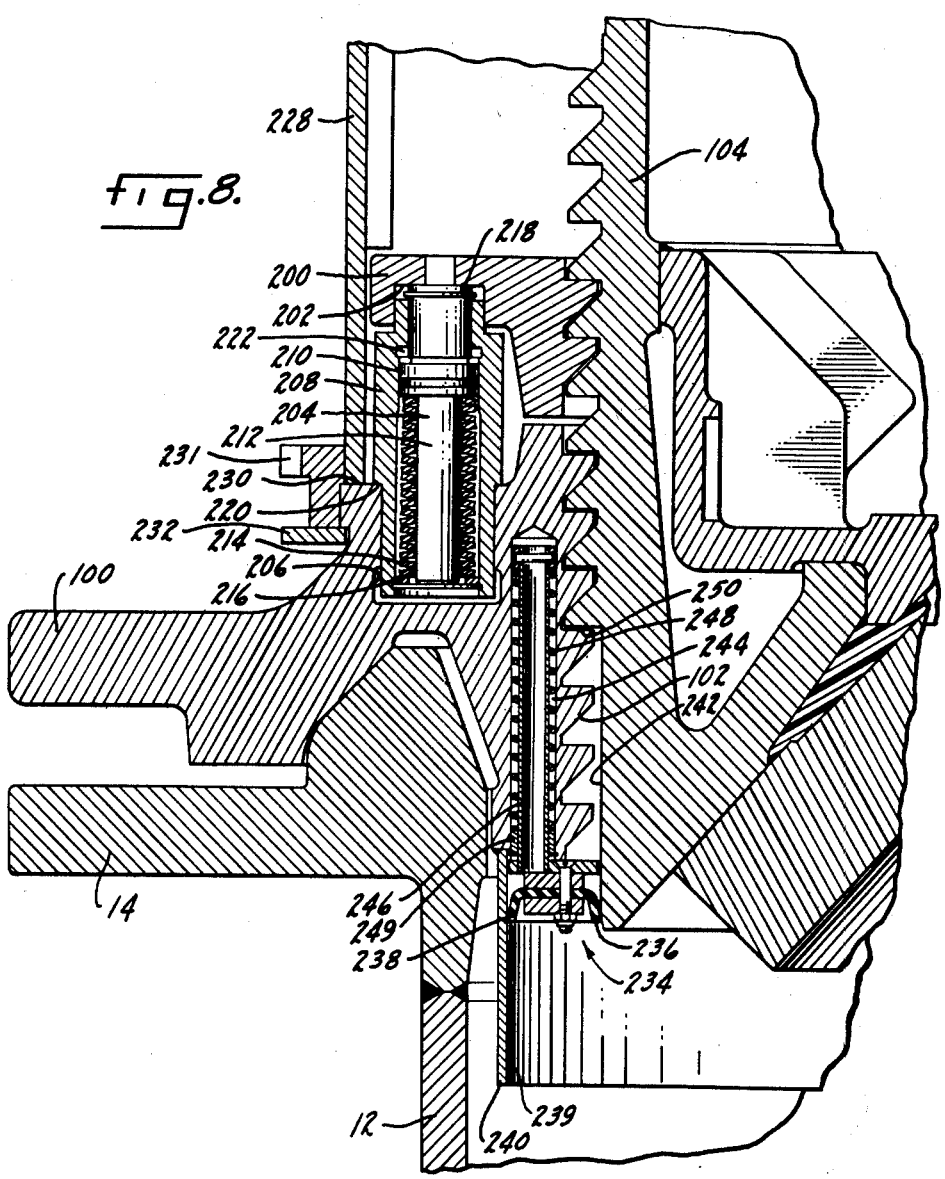
FIGURE 8 is a portion of FIGURE 1, on an enlarged scale.

Each of the clamping units, such as shown in FIGURE 8, may include a cylindrical housing or cylinder 208 which carries a piston 210 having a rod 212 surrounded by a spring arrangement, shown in this case as a collection of axially aligned spring washers 214 which bear at their upper end against the piston and at their lower end against a seat ring 216 held in the cylinder by a suitable snap ring or the like. The rod extends through the top of the cylinder to bear against the locking ring at 218. The outside of the cylinder may have a shoulder at 220 which seats on the top of the adjustment ring. The dimensioning is such that the spring arrangement applies a vertical thrust between the adjustment ring and locking ring so that the clamping units, as a group, are effective around the crusher to apply an upthrust to the bowl through the locking ring. For example, 4, 6 or 8 such units may be positioned at spaced intervals about the crusher to apply a uniform upthrust to the locking ring and bowl. The total upthrust of all units may be just slightly more than the weight of the bowl structure so that thread clearance will be eliminated. On the other hand, the total upthrust may be sufficiently large so that it not only eliminates thread clearance but also binds the threads between the bowl and adjustment ring sufficiently to lock the bowl against rotation during normal crushing. Any number of upthrust units may be used.

The top of the piston 210 inside of each clamp unit may form a chamber 222 which may be connected to a suitable supply of high pressure hydraulic fluid or the like. All of the cylinders may be interconnected so that when high pressure fluid is supplied, the piston 210 in each unit will be forced down compressing the washer spring somewhat to lower the locking ring load. This frees the bowl for adjustment.

The threads between the bowl, adjustment ring and locking ring may be protected by a top cap 224 which is sealed at 226 to the bowl extension with a skirt 228 which rests at 230 on the adjustment ring. A torque ring 231 may be connected to the outside of the top cap and releasably held on the adjustment ring by a plurality of levers 232, shown in FIGURE 7, which pivot under a flange on the adjustment ring. The upper end of the bowl may be keyed to the top cap at 233 so that when the top cap is rotated, the bowl will be rotated and, at the same time, may move up or down. Since the thrust units are positioned between the adjustment ring and locking ring and socket into each, these units, in effect, key the locking ring to the adjustment ring so that one cannot rotate relative to the other.

The machine may have more sockets in the locking ring than there are clamping units 204. For example, six clamping units 204 may be provided with twelve sockets in the locking ring. It is preferred that the clamping units be spaced around the machine, for example in every other socket in the locking ring. In the event of excessive wear in the threads between the bowl and adjustment ring, the locking ring can be indexed or rotated down to make up the clearance caused by wear. The bowl assembly would first be backed out and removed, and then the locking ring would be picked up, rotated a given amount, and lowered back with different sockets on the clamping units.

The bottom of the threads between the bowl and adjustment ring may be closed by a seal 234, which has a continuous annular sealing member with inner and outer lips 236 and 238 attached to the lower end of the adjustment ring. An outer cylindrical surface 239 in the form of a depending shield or plate 240 attached to the adjustment ring may be opposite the outer lip of the sealing member and the bowl may have an inner cylindrical surface 242 extending upwardly from its lower edge to the point where the bowl thread starts. The adjustment ring may have a plurality of sockets 244 at suitable intervals around the crusher with a rod 246, each surrounded by a coil spring 248 or the like. The coil spring is supported on a ring 249 held in place by a snap ring so that the springs force the rods up, thereby keeping the seal against the bottom of the adjustment ring. However, as the liner and mantle wear away and the bowl is adjusted down, the bottom 250 of the bowl threads will contact the sealing member 234 about half way down. Further adjustment of the bowl down will push the seal down compressing the springs 248. When the mantle and liner are sufficiently worn that they must be replaced, the bowl is turned back up and the springs cause the seal to follow until the seal hits the bottom of the adjustment ring. During approximately the first half of bowl adjustment down, the inner lip 236 of the seal wipes against the bowl surface 242, and during approximately the second half the outer lip 238 wipes against the adjustment ring surface 239. The arrangement shown has the advantage that the rods and springs are up inside the adjustment ring and will not be clogged by dirt, dust and moisture.

On occasion the crusher will stall due to tramp iron and other foreign material in the crushing cavity or a power failure and it is desirable to release the machine by raising the bowl and adjustment ring assembly. A plurality of jacks 252 are provided around the crusher, each of which may be mounted on a pedestal or post 254 having a push rod 256 above it passing through the upper flange of the main frame to contact the adjustment ring. When high pressure fluid is supplied to the jacks by a suitable connection 258, the upthrust of the jacks will raise the adjustment ring and compress the spring clusters. The spring clusters 260 may be grouped in pairs, as at 262 in FIGURE 2, with a jack 252 between adjacent pairs.

As shown in FIGURES 2 and 5, the adjustment mechanism D may take the form of two rams 300, shown as mounted on the adjustment ring at 302, 180° apart, although it might be otherwise. Each includes a yoke 304 with a stub 306 extending from the lower end through an opening in the adjustment ring. The ram cylinder 308 is pivoted to the ears of the yoke at 310. The piston 312 of the ram has a nose 314 on the outer end connected to it by a pin 316. A suitable hydraulic connection 318 is connected to the rear of the cylinder to supply high pressure fluid as desired, to cause the piston to extend. A suitable spring 320 may be connected at one end to the piston pin 316 and at its other end to the cylinder plug 322 so that the ram will have a power excursion and a spring return.

In FIGURE 6, the nose of the ram is shown as being concave or indented on each side thereof, as at 324, so that the forward edge 326 will properly engage the teeth on torque ring 231.

The lower end of the yoke pin extends below the adjustment ring and is surrounded by a coil spring 328 or the like, one end of which is connected to the pin at 330 and the other end to the adjustment ring at 332. The spring tends to bring the ram to a generally radial position on the main frame. Thus, when the rams are disposed to rotate the bowl either clockwise or counter-clockwise in FIGURE 2, they will always be held in against the teeth of the torque ring. To reverse the direction of rotation, the ram is lifted up about its pivot 310 until it clears the outside of the top cap, then manually rotated and lowered on the other side. But in either position, the spring 328 will hold it in against the torque ring.

The rams may be fast enough for normal adjustment. For changing worn out liners, which requires backing the bowl all the way out, they may be far too slow. Therefore, a sheave 334, shown in FIGURE 1, may be mounted on the adjustment ring, at 335 in FIGURE 2, to pivot, one way or the other, so that the bowl may be rapidly turned up or down by a cable and crane, if desired. To prevent the bowl from rotating during crushing, a lock 336 in the form of a pawl is held by a spring 338 against the torque ring and pivoted on the adjustment ring at 340. The direction of rotation of the head is such that it tends, during normal crushing, to rotate the bowl up. The lock prevents such rotation. When the rams adjust the bowl down, the teeth of the torque ring merely ratchet by the lock 336. When the mantle and liner are worn out and need to be replaced, the lock 336 may be pivoted over center away from the torque ring while the bowl is being turned up.

It will be realized that whereas a practical and operative device has been described and claimed, nevertheless many changes may be made in the size, shape, number and disposition and relation of parts without departing from the spirit of the invention. It is therefore wished that the description and drawings be taken as in a broad sense illustrative or diagrammatic rather than as limiting to the precise showing.

The use, operation and function of the invention are as follows:

A gyratory crusher is provided with a mechanism for automatically but controllably eliminating thread clearance between the bowl and adjustment ring. The arrangement has the advantage that the clamp units are completely covered by the top cap and are in no way accessible to dirt, dust and foreign material. Thus, no dirt can get into the hydraulics or springs and the hydraulic connections may be tight and do not constitute a problem. Further, the exterior appearance of this machine is not marred.

Further, the clamp units may be positioned around the machine according to any suitable spacing and in any number to provide any desired amount of upthrust. For example, just sufficient upthrust may be provided to counterbalance the weight of the bowl structure so that thread clearance alone is eliminated during normal operation of the machine. The bowl may be prevented from rotating by a suitable positive lock, or sufficient additional upthrust may be provided in the clamp units to automatically lock the bowl.

The clamp units also key or tie the locking ring to the adjustment ring, so that the threads of the locking ring become, in effect, a continuation of the threads on the adjustment ring. Since the bowl is keyed to the top cap above the locking ring, when the torque ring is rotated by the rams or by a separate cable and crane, the bowl will be rotated either down or up during adjustment or replacement of the manganese wearing parts.

The use of washer type springs has the advantage of a short stroke with high thrust, but it should be understood that any suitable spring arrangement between the adjustmen ring and locking ring may be used. Releasing the locking ring and bowl for adjustment is preferably hydraulic.

When the bowl is to be adjusted, the clamping thrust is released and the rams index the bowl to bring the cavity back to size. Also, during crushing the peripheral bowl load is on a fixed stop and not on the rams.

The sealing arrangement 234 below the bowl threads has the advantage of reducing the over-all crusher height since the seal first wipes against one surface and then against the other. The springs should be constructed to force the seal up with sufficient thrust to overcome gravity and the down friction of the bowl. The arrangement has the additional advantage that the springs are totally enclosed in the adjustment ring behind and fully protected by the seal itself. Thus, no dirt, dust and foreign matter from the crushing operation can clog or jam the springs or the rods that hold the springs.

The rams provide for easy adjustment to rotate the bowl in either direction. Only one man is required to pivot the ram up in its yoke support and then turn the ram and yoke from one side to the other. The spring automatically centers or pulls the ram toward the bowl to engage the torque ring. The ram has been shown as hydraulic, but it might be air operated or otherwise. Also, two rams have been shown, but more or less might be used. It is preferred that two be used, approximately 180° apart, so that the inward component of ram thrust from one will be counterbalanced against the other. Thus, the bowl has no tendency to bind due to ram thrust. The rams have been shown with a power thrust and spring return but they might be double acting.

The drive to the head is the countershaft in a box which joins the outer housing of the main frame and the center support for the head. The inside dimension of the box does not have to be large enough to allow the pinion to be inserted, since the pinion is dropped down into the pocket in the main frame from above and the countershaft is then connected to the pinion. This allows the drive to come in through one of the arms between the outer housing and the center support. This has the advantage that the high torques and stresses from the drive are supported directly by one of the frame arms. In effect, the countershaft is supported in a structure of maximum strength.

We claim:

1. In a cone crusher and the like, a main frame, an adjustment ring on the main frame, a spring release normally holding the adjustment ring against tilting movement relative thereto, a bowl screw-threaded in the adjustment ring, a locking ring screw-threaded to the bowl above the adjustment ring, and an annular means arranged generally in a circle between the locking and adjustment rings to provide an upward thrust to the locking ring and bowl to remove thread clearance during normal operation of the crusher.

2. The structure of claim 1 further characterized in that the annular means includes a plurality of individual biasing units, each of the biasing units including a spring arrangement for applying an upthrust to the locking ring, and a fluid piston and cylinder assembly for overcoming and compressing the spring arrangement, thereby releasing the locking ring and bowl.

3. The structure of claim 2 further characterized in that each of the spring arrangements includes a plurality of axially aligned spring washers.

4. The structure of claim 2 further characterized in that the biasing units function as a key connection between the locking ring and adjustment ring to prevent one from rotating relative to the other.

5. In a gyratory cone crusher, a main frame, a bowl screw-threaded in the main frame for rotary adjustment, a locking ring threaded to the bowl above the main frame, and a plurality of individual biasing units positioned between the locking ring and main frame for applying an upward releasable thrust to the locking ring.

6. The structure of claim 5 further characterized in that each of the biasing units includes a spring arrangement for applying an upthrust to the locking ring, and a fluid piston and cylinder assembly for overcoming and compressing the spring arrangement, thereby releasing the locking ring and bowl.

7. The structure of claim 6 further characterized in that each of the spring arrangements includes a plurality of axially aligned spring washers.

8. The structure of claim 5 further characterized in that the main frame includes an adjustment ring yieldably mounted thereon, the bowl being screw-threaded in the adjustment ring.

9. The structure of claim 5 further characterized in that the main frame includes an adjustment ring yieldably mounted thereon, the bowl being screw-threaded in the adjustment ring, and a top cap mounted on the main frame and surrounding and enclosing the locking ring and biasing units and resting on the adjustment ring to prevent accumulation of dirt and dust thereon.

References Cited in the file of this patent

UNITED STATES PATENTS

| | | |
|---|---|---|
| 1,355,922 | Smith | Oct. 19, 1920 |
| 1,507,970 | Lazor | Sept. 9, 1924 |
| 2,052,706 | Guest | Sept. 1, 1936 |
| 2,218,783 | Bernhard | Oct. 22, 1940 |
| 2,687,257 | Rumpel | Aug. 24, 1954 |
| 2,747,804 | Rumpel | May 29, 1956 |
| 3,009,660 | Symons | Nov. 21, 1961 |
| 3,019,994 | Symons | Feb. 6, 1962 |

Disclaimer 3,140,835.—*Hansjörg Balmer* and *Rudolph J. Gasparac*, both of Milwaukee, Wis. BOWL CLAMPING MECHANISM FOR CONE CRUSHERS. Patent dated July 14, 1964. Disclaimer filed June 1, 1971, by the assignee, *Rex Chainbelt Inc.*

Hereby enters this disclaimer to claim 1 of said patent.

[*Official Gazette August 31, 1971.*]